(12) United States Patent
Gu

(10) Patent No.: US 6,181,088 B1
(45) Date of Patent: Jan. 30, 2001

(54) CATHODE RAY TUBE APPARATUS HAVING A PROTECTION CIRCUIT FOR PROTECTING A CATHODE RAY TUBE DRIVING CIRCUIT AND A METHOD THEREFOR

(75) Inventor: Sung-Jin Gu, Suwon (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 08/893,829

(22) Filed: Jul. 11, 1997

(30) Foreign Application Priority Data

Jul. 11, 1996 (KR) .................................................. 96-28027
Oct. 17, 1996 (KR) .................................................. 96-46519

(51) Int. Cl.$^7$ .................................................. G09G 1/04
(52) U.S. Cl. ........................ 315/364; 348/173; 348/540; 348/547
(58) Field of Search ........................ 315/364, 3, 368.18, 315/379; 348/173, 177, 377, 378, 540, 547; 345/10, 11, 211, 212, 213, 214

(56) References Cited

U.S. PATENT DOCUMENTS

| | | | |
|---|---|---|---|
| 4,459,517 | * 7/1984 | Hicks | 315/408 |
| 4,654,717 | * 3/1987 | Stoughton | 358/243 |
| 4,820,959 | * 4/1989 | Griffey | 315/384 |
| 5,089,754 | * 2/1992 | George | 315/386 |
| 5,463,289 | 10/1995 | Song | 315/384 |
| 5,491,794 | * 2/1996 | Wu | 348/177 |
| 5,502,502 | * 3/1996 | Gaskill et al. | 348/547 |
| 5,555,032 | * 9/1996 | Kung | 345/211 |
| 5,671,017 | * 9/1997 | Chujo | 348/378 |

* cited by examiner

Primary Examiner—Haissa Philogene
Assistant Examiner—Thuy Vinh Tran
(74) Attorney, Agent, or Firm—Robert E. Bushnell, Esq.

(57) ABSTRACT

A cathode ray tube display apparatus having a protection circuit which cuts off supply of a synchronization signal, i.e., the horizontal and/or vertical synchronization signals, to a cathode ray tube driving circuit in response to a state signal indicating when frequencies of the synchronization signals exceed a limited range. The protection circuit prevents the cathode ray tube driving circuit from being damaged by abnormal variations in the frequencies of the synchronization signals.

17 Claims, 3 Drawing Sheets

CATHODE RAY TUBE APPARATUS HAVING A PROTECTION CIRCUIT FOR PROTECTING A CATHODE RAY TUBE DRIVING CIRCUIT AND A METHOD THEREFOR

CLAIM OF PRIORITY

This application makes reference to, incorporates the same herein, and claims all benefits accruing under 35 U.S.C §119 from an application filed in the Korean Industrial Property Office on Jul. 11, 1996, and there duly assigned Ser. No. 96-28027 and from an application filed in the Korean Industrial Property Office on Oct. 17, 1996, and there duly assigned Ser. No. 96-46519 by that Office.

BACKGROUND OF THE INVENTION

1. Field of the Invention

The present invention relates to a display apparatus having a cathode ray tube (CRT), and more particularly to a protection circuit and method for protecting a cathode ray tube driving circuit therein against abnormal frequencies of synchronization signals.

2. Background Art

As is well known, a cathode ray tube display apparatus is used as a peripheral apparatus having such a function that a user can see information displayed on its cathode ray tube screen in a personal computer system. It is also known to mute the first grid of the cathode ray tube during a mode conversion or power-on state to prevent a distorted of the raster as contemplated by U.S. Pat. No. 5,463,289 to Moon J. Song and entitled First Grid Muting Circuit.

Additionally, a cathode ray tube display apparatus has a display function which is operated in a text mode or a graphic mode in accordance with the sort of data for display. Thus, when text data is displayed in the cathode ray tube display apparatus, i.e., in a text mode, the computer transfers the text data to the display apparatus, while outputting horizontal and vertical synchronization signals corresponding to the text mode. On the other hand, when there is a necessity of displaying graphic data, the computer transfers the graphic data to the display apparatus, while outputting horizontal and vertical synchronization signal corresponding to the graphic mode to the display apparatus.

I have found that when the frequencies of the synchronization signals H_SYNC and V_SYNC are changed over limited ranges, in the typical contemporary design, a microcomputer will interrupt generation of horizontal and vertical synchronization signals. The microcomputer however, still permits the synchronization signal generator to provide the horizontal and vertical synchronization signals. If the frequencies of these synchronization signals grossly exceeds the limited ranges within a particular interval, the microcomputer will be unable to immediately interrupt the abnormal frequencies. I have noticed that consequently that the microcomputer will not be able to prevent the generation of these abnormal frequencies until expiration of a predetermined period. This may, unfortunately, results in the cathode ray tube driving circuit being damaged by the abnormal frequencies.

SUMMARY OF THE INVENTION

It is therefore an object of the present invention to provide an improved cathode ray tube driving process and circuit.

It is another object to provide a cathode ray tube apparatus having a protection circuit and method for protecting a cathode ray tube driving circuit from being severely damaged by abnormal high frequencies which are beyond limited ranges.

It is still another object to provide a cathode ray tube display apparatus which can safely drive a cathode ray tube regardless of the frequency changes of the synchronization signals.

According to an aspect of the present invention, a cathode ray tube display apparatus having a cathode ray tube, and a cathode ray tube driving circuit which drives the cathode ray tube in response to a synchronization signal provided from a host, comprises: a state signal generating circuit for receiving the synchronization signal to generate a state signal indicating when a frequency of the synchronization signal is changed; and a protection circuit for cutting off supply of the synchronization signal to the cathode ray tube driving circuit in response to the state signal for preventing the cathode ray tube driving circuit from being damaged in response to a change in frequency of the synchronization signal.

In an embodiment of this aspect, the state signal generating circuit generates the state signal when the frequency of the synchronization signal exceeds a limited range. The synchronization signal is either a horizontal or vertical synchronization signal. The protection circuit comprises a switch driving section for generating a switch driving signal in response to the state signal; and a switch section responsive to the switch driving signal, for connecting the synchronization signal received from the state signal generating circuit to a grounding terminal. Also, the cathode ray tube device further comprises a microcomputer, wherein the microcomputer receives the synchronization signal provided from the host and supplies the received synchronization signal to the state signal generating circuit.

According to another aspect of the present invention, a cathode ray tube display apparatus having a cathode ray tube, and a cathode ray tube driving circuit which drives the cathode ray tube in accordance with a synchronization signal provided from a host, comprises: a microcomputer for receiving the synchronization signal provided from the host; a state signal generating circuit for receiving the synchronization signal from microcomputer, and when a frequency of the synchronization signal is changed, for generating a state signal which indicates when the frequency of the synchronization signal exceeds a limited range; a switch driving circuit for generating a switch driving signal in response to the state signal; and a switch circuit responsive to the switch driving signal, for connecting the synchronization signal from state signal generating circuit to a ground terminal, such that the switch driving circuit and the switch circuit prevent the cathode ray tube driving circuit from getting damaged when a change in the frequency of the synchronization signal is excessive.

In an embodiment of this aspect, the synchronization signal is either a horizontal or vertical synchronization signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
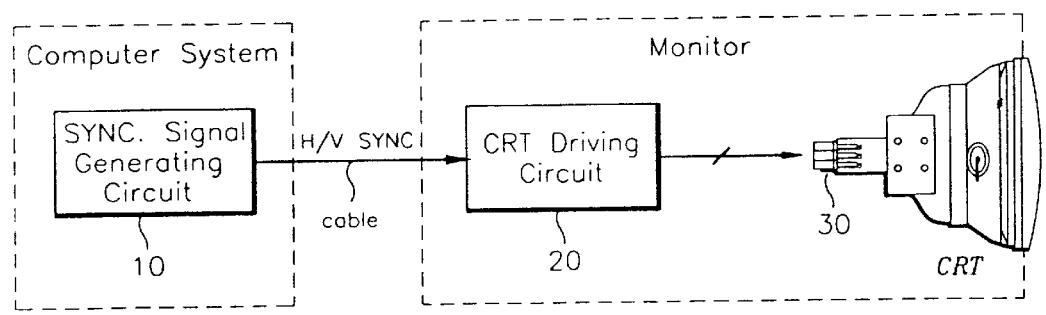
FIG. 1 is a block diagram showing the combination of a hypothetical conventional cathode ray tube display apparatus and a personal computer in order to illustrate the transmission of synchronization signals from the computer to the cathode ray tube display apparatus.

Turning now to the drawings, FIG. 1 illustrates a synchronization signal generating circuit 10 for a computer that generates horizontal and vertical synchronization signals H_SYNC and V_SYNC corresponding to a graphic or text mode, respectively. Generally, it is known that synchronization signal generating circuit 10 is provided for a video graphics array (VGA) card. And, the cathode ray tube display apparatus is typically constructed with a cathode ray tube 30 and a cathode ray tube driving circuit 20 for receiving the synchronization signals H_SYNC and V_SYNC from synchronization signal generating circuit 10 through a cable connected with the computer to drive cathode ray tube 30. When a mode is changed, sync circuit 10 generates the synchronization signals H_SYNC and V_SYNC corresponding to the changed mode. And, cathode ray tube driving circuit 20 drives cathode ray tube 30 in response to the changed synchronization signals H_SYNC and V_SYNC. The cathode ray tube display apparatus further comprises a microcomputer for checking whether or not the frequencies of the synchronization signals H_SYNC and V_SYNC provided from the computer belong to limited ranges, respectively. The microcomputer periodically checks the frequency variations of the synchronization signals $H_{SYNC\ and\ V}$_SYNC every predetermined duration (e.g., 30 ms to 100 ms). If the frequencies of the synchronization signals H_SYNC and V_SYNC are changed and the changed frequencies are over the limited ranges, the microcomputer cuts off the synchronization signals H_SYNC and V_SYNC. However, the microcomputer still permits the synchronization signal generating circuit 10 to output the synchronization signals H_SYNC and V_SYNC within the duration to cathode ray tube driving circuit 20. Thus, If the frequencies of the synchronization signals H_SYNC and V_SYNC abnormally exceed the limited ranges within the duration, the microcomputer can not cut off the abnormal frequencies immediately. The microcomputer can cut off the abnormal frequencies after a predetermined time elapse, but this may cause damage to cathode ray tube driving circuit 20 due to the occurrence of the abnormal frequencies.

Figure 2:
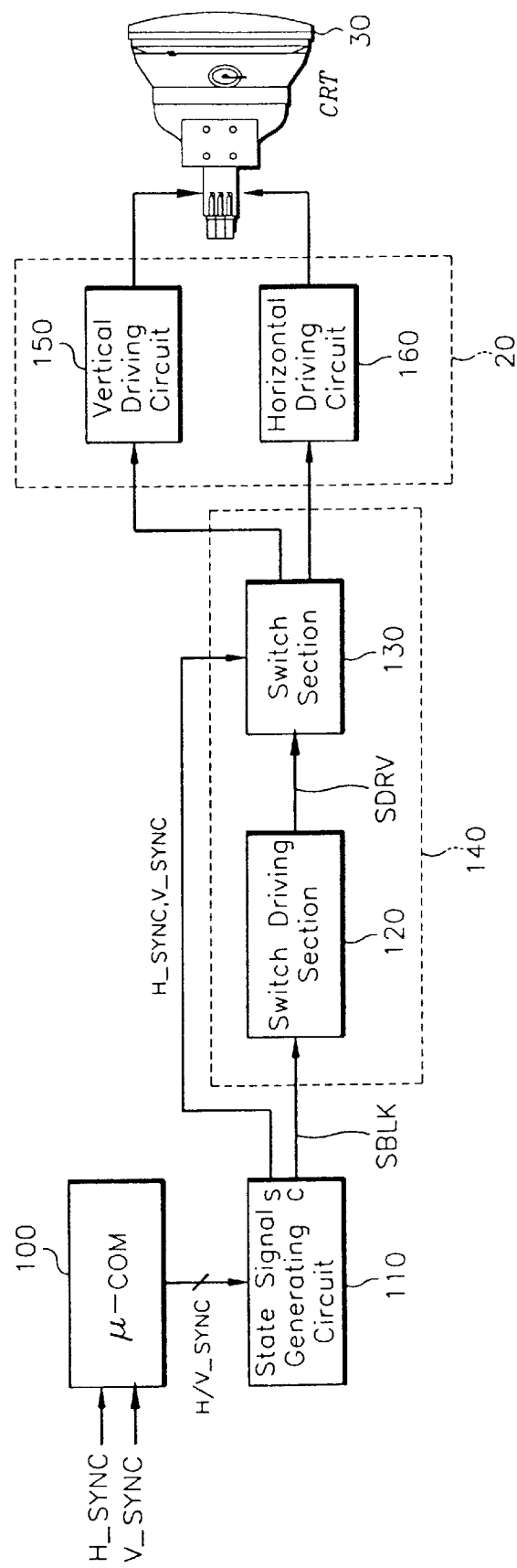
FIG. 2 is a block diagram showing a cathode ray tube display apparatus according to an embodiment of the present invention.

Referring now to FIG. 2, a novel cathode ray tube display apparatus according to an embodiment of the prevent invention has a cathode ray tube 30, a cathode ray tube driving circuit 20 for driving cathode ray tube 30, a state signal generating circuit 110 for generating a state signal SBLK from an output terminal C thereof when abnormal variations in the frequencies of synchronization signals H_SYNC and V_SYNC occur, and a protection circuit 140, which can cut off supply of the synchronization signals H_SYNC and V_SYNC into cathode ray tube driving circuit 20, in response to the state signal SBLK, to prevent cathode ray tube driving circuit 20 from being damaged by abnormal variations in the frequencies of the synchronization signals H_SYNC and V_SYNC.

When frequencies of the synchronization signals H_SYNC and V_SYNC are changed in accordance with display modes, for example, a text display mode and a graphic display modes, the abnormal variations in the frequencies occur. These abnormal variations could lead to damage of cathode ray tube driving circuit 20 if the abnormal frequencies of the synchronization signals were provided directly to cathode ray tube driving circuit 20.

Referring again to FIG. 2, the cathode ray tube display apparatus also comprises a microcomputer 100. Microcomputer 100 receives horizontal and vertical synchronization signals H_SYNC and V_SYNC from a host such as a personal computer (as shown in FIG. 1). Microcomputer 100 has a function of checking the synchronization signals periodically, for example, every 30 ms to 100 ms. Particularly, when the frequency of the horizontal synchronization signal H_SYNC is over a limited range of 30 kHz to 60 kHz, for example, a video mute function is performed in accordance with a control operation of microcomputer 100.

State signal generating circuit 110 receives the synchronization signals H_SYNC and V_SYNC from microcomputer 100 and generates a state signal SBLK indicating when the frequencies of the synchronization signals H_SYNC and V_SYNC are over the limited ranges, respectively. Herein, state signal generating circuit 110 has such cathode ray tube control functions as to control horizontal position, horizontal oscillation, vertical oscillation, vertical size, etc., in response to the synchronization signals H_SYNC and V_SYNC from microcomputer 100.

So as to protect cathode ray tube driving circuit 20 against a damage due to abnormally high frequencies beyond the limited frequency range occurring when frequencies of the synchronization signals H_SYNC and V_SYNC are changed, state signal generating circuit 110 detects when the synchronization signals are changed beyond the limited range and generates the state signal SBLK. Then, protection circuit 140 cuts off the supply of the synchronization signals H_SYNC and V_SYNC to cathode ray tube driving circuit 20 in response to the state signal SBLK.

As shown in FIG. 2, protection circuit 140 has two main sections, a switch driving section 120 and a switch section 130. Switch driving section 120 is provided to receive the state signal SBLK from state signal generating circuit 110 and generates a switch driving signal SDRV. Switch section 130 is provided to connect the synchronization signals H_SYNC and V_SYNC to a ground terminal in in response to the switch driving signal SDRV. For example, when the frequency of the horizontal synchronization signal H_SYNC is not over the limited range, i.e., 30 kHz to 60 kHz, protection circuit 140 delivers the synchronization signals H_SYNC and V_SYNC from the state signal generating circuit 110 to cathode ray tube driving circuit 20. On the other hand, when the frequency of the synchronization signal H_SYNC is over the limited range, switch driving section 120 generates the switch driving signal SDRV activated while the synchronization signal H_SYNC is recovered from the abnormal high frequency to the normal frequency of the previous state. Thus, switch section 130 connects the synchronization signals H_SYNC and V_SYNC to the ground terminal while the switch driving signal SDRV is activated. When the frequency of the vertical synchronization signal V_SYNC becomes beyond a limited range, e.g., 60 Hz to 120 Hz, protection circuit 140 is also operated in the same manner as in the above described operations. Therefore, the cathode ray tube display apparatus of the present invention can prevent cathode ray tube driving circuit 20 from being damaged due to the abrupt variations in the frequencies of the synchronization signals H_SYNC and V_SYNC.

Figure 3:
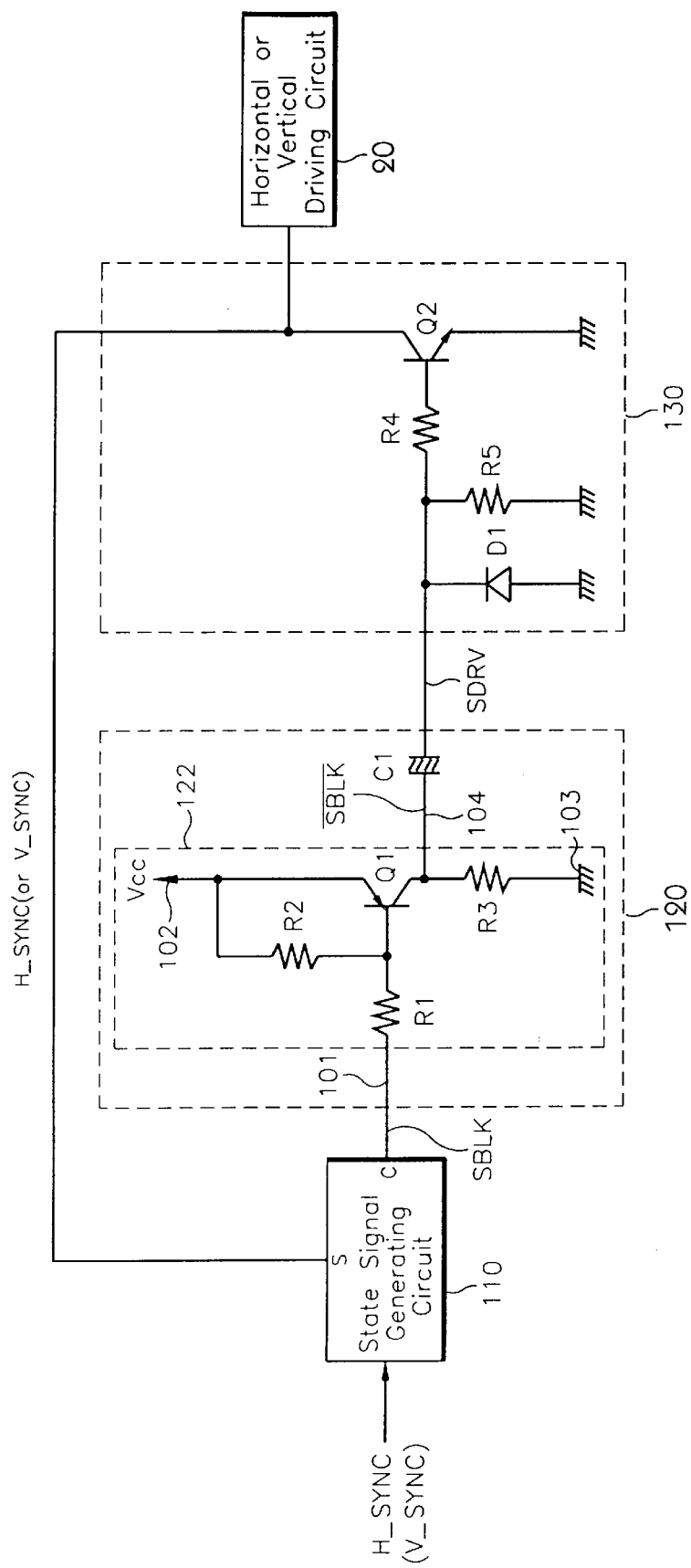
FIG. 3 is a detailed circuit diagram of the protection circuit shown in FIG. 2.

FIG. 3 illustrates a detailed circuit diagram of one example of the protection circuit of FIG. 2. In the figure, there is shown the protection circuit 140 only associated with the horizontal synchronization signal H_SYNC, but a circuit in relation with the vertical synchronization signal V_SYNC may have the same configuration of the circuit as shown in FIG. 3, or an obvious modified version of it can be configured.

Referring again to FIG. 3, switch driving section 120 of protection circuit 140 includes three resistors R1, R2 and R3, a PNP transistor Q1, and a capacitor C1. One terminal of resistor R1 is connected to an input terminal 101 for receiving the state signal SBLK applied from output terminal C of state signal generating circuit 110, the other terminal of resistor R1 is connected to the base of transistor Q1. Resistor R2 is coupled between an emitter connected to a first power supply terminal 102 and the base of transistor Q1. The collector of the transistor Q1 is connected through resistor R3 to a ground terminal 103. Power supply terminals 102 is supplied with a supply potential Vcc. Herein, resistors R1, R2 and R3 and transistor Q1 serve as an inverter 122 for inverting the state signal SBLK. And, capacitor C1 is coupled between switch section 130 and the collector of transistor Q1, via an output terminal 104 of inverter 122.

Switch section 130 of protection circuit 140 has two resistors R4 and R5, a diode D1, and a NPN transistor Q2. Transistor Q2 has a collector to which the horizontal synchronization signal H_SYNC (or vertical synchronization signal V_SYNC) is applied, an emitter connected to ground terminal 103, and a base to which the switch driving signal SDRV is applied through resistor R4 from capacitor C1. Diode D1 has a cathode terminal coupled between capacitor C1 and the resistor R4 and an anode terminal connected to the ground terminal 103. And, resistor R5 is coupled in parallel with diode D1.

Figure 4:
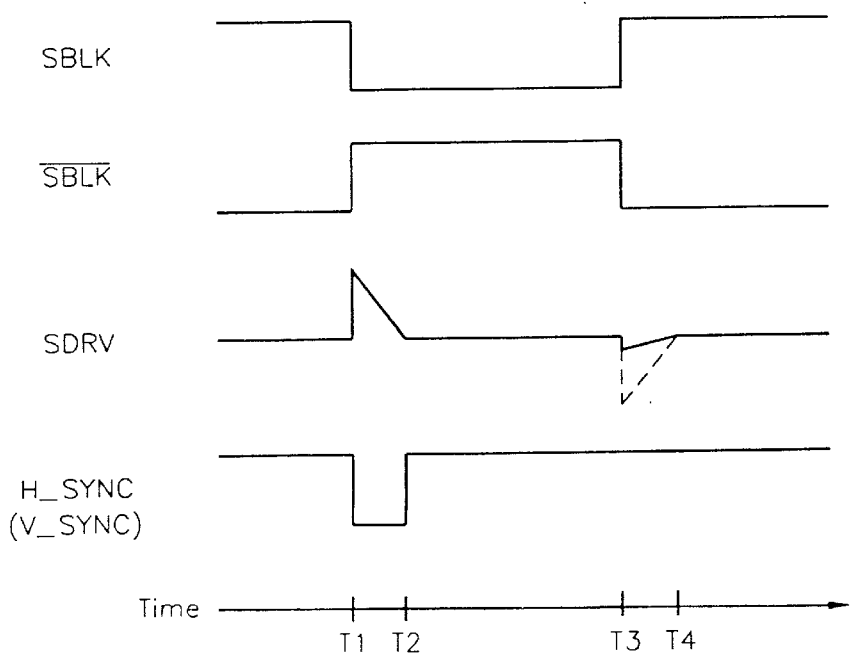
FIG. 4 is a timing diagram showing waveforms of signals which appear at respective terminals shown in FIG. 3.

FIG. 4 is a timing diagram showing the waveforms of signals appearing at respective terminals of FIG. 3. Hereinafter, the protection operation according to the present invention will be described with reference to FIGS. 2, 3 and 4.

Microcomputer 100 receives the synchronization signals H_SYNC and V_SYNC from the host and checks their frequencies. As an example, the frequencies of the synchronization signals H_SYNC and V_SYNC are changed according to the conversion from a text mode to a graphic mode. At this time, while the frequencies of the synchronization signals H_SYNC and V_SYNC are being changed, abnormal high frequencies beyond the limited ranges of the cathode ray tube display apparatus can be generated.

State signal generating circuit 110, receives the synchronization signals H_SYNC and V_SYNC from microcomputer 100 and generates a state signal SBLK having a low logic level as shown in FIG. 4. Inverter 122 provides an inverted state signal $\overline{SBLK}$ to capacitor C1 of switch driving section 120. Subsequently, switch driving section 120 generates the switch driving signal SDRV when the state signal SBLK is at a period of a transition, this is, at a period T1–T2. Then, when the switch driving signal SDRV is generated, transistor Q2 of switch section 130 is turned on so that switch section 130 connects the horizontal synchronization signal H_SYNC to the ground terminal 103. And, the state signal SBLK from the state signal generating circuit 110 is inactivated at a time T3. At this time, the switch driving signal SDRV is generated such that the phase of the switch driving signal SDRV generated at the time T3–T4 is inverted. However, since the inverted switch driving signal SDRV is passed through diode DI to the ground terminal, the signal does not affect the operation of transistor Q2.

As described above, according to the invention, even though the frequencies of synchronization signals are abruptly varied over limited ranges, the supply of the synchronization signals to a cathode ray tube driving circuit is cut off by the protection circuit, resulting in preventing a damage of the cathode ray tube driving circuit due to the abnormal frequencies.

What is claimed is:

1. A cathode ray tube display apparatus having a cathode ray tube and a cathode ray tube driving circuit which drives the cathode ray tube in accordance with a synchronization signal provided from a host, said cathode ray tube display apparatus comprising:

a state signal generating circuit for receiving said synchronization signal, and generating a state signal by detecting an abnormal frequency of said synchronization signal when said frequency is changed in response to a change in a display mode; and a protection circuit for cutting off supply of said synchronization signal to said cathode ray tube driving circuit in response to said state signal to prevent said cathode ray tube driving circuit from being damaged when said abnormal frequency is detected.

2. The cathode ray tube display apparatus as set forth in claim 1, wherein said abnormal frequency is detected when the frequency of said synchronization signal exceeds a limited range.

3. The cathode ray tube display apparatus as set forth in claim 1, wherein said synchronization signal is a horizontal synchronization signal.

4. The cathode ray tube display apparatus as set forth in claim 1, wherein said synchronization signal is a vertical synchronization signal.

5. The cathode ray tube display apparatus as set forth in claim 1, wherein state signal generating circuit outputs said synchronization signal to said protection circuit and said protection circuit comprises:

a switch driving means for generating a switch driving signal in response to said state signal; and a switch means for connecting said synchronization signal received from said state signal generating circuit to a ground terminal in response to said switch driving signal.

6. The cathode ray tube display apparatus as set forth in claim 5, wherein said switch driving circuit comprises:

an inverter for producing an inverted state signal by inverting said state signal; and a capacitor, connected between said inverter and said switch means, for producing said switch driving signal for driving said switch means in response to said inverted state signal.

7. The cathode ray tube display apparatus as set forth in claim 6, wherein said inverter comprises:

an input terminal for receiving said state signal;

an output terminal for outputting said inverted state signal to said capacitor;

a first power supply terminal for receiving a power supply voltage;

a first resistor having one terminal connected to said input terminal;

a second resistor connected between said first power supply terminal and a second terminal of said first resistor;

a third resistor connected between said output terminal and said ground terminal; and a first transistor having a base connected to said second terminal of said first resistor, an emitter connected to said first power supply terminal, and a collector connected to said output terminal.

8. The cathode ray tube display apparatus as set forth in claim 7, wherein said switch means comprises:

a fourth resistor having one terminal connected to said capacitor for receiving said switch driving signal;

a fifth resistor connected between said ground terminal and said one terminal of said fourth resistor;

a diode having a cathode connected to said one terminal of said fourth resistor and an anode connected to said ground terminal; and a second transistor having a base connected a second terminal of said fourth resistor, an emitter connected to said ground terminal, and a collector to which said synchronization signal output from said state signal generating circuit is applied.

9. The cathode ray tube display apparatus as set forth in claim 1, wherein said cathode ray tube device further comprises a microcomputer, said microcomputer receiving said synchronization signal provided from said host and supplying said received synchronization signal to said state signal generating circuit.

10. A cathode ray tube display apparatus having a cathode ray tube and a cathode ray tube driving circuit which drives the cathode ray tube in accordance with a synchronization signal provided from a host, said cathode ray tube display apparatus comprising:

a microcomputer for receiving said synchronization signal provided from said host;

a state signal generating circuit for receiving said synchronization signal from microcomputer, said state signal generating circuit outputting said synchronization signal and generating a state signal indicating when a frequency of said synchronization signal is not within a predetermined range;

a switch driving circuit for generating a switch driving signal in response to said state signal; and a switch circuit for preventing said cathode ray tube driving circuit from being damaged by connecting said synchronization signal output from said state signal generating circuit to a ground terminal in response to said switch driving signal.

11. The cathode ray tube device as set forth in claim 10, wherein said synchronization signal is a horizontal synchronization signal.

12. The cathode ray tube device as set forth in claim 11, wherein said synchronization signal is a vertical synchronization signal.

13. The cathode ray tube display apparatus as set forth in claim 10, wherein said switch driving circuit comprises:

an input terminal for receiving said state signal;

a first power supply terminal for receiving a power supply voltage;

a first resistor having one terminal connected to said input terminal;

a second resistor connected between said first power supply terminal and a second terminal of said first resistor;

a third resistor having one terminal connected to said ground terminal;

a first transistor having a base connected to said second terminal of said first resistor, an emitter connected to said first power supply terminal, and a collector connected to a second terminal of said third resistor; and a capacitor connected to said collector, said capacitor receiving an inverted state signal from said collector and outputting an output terminal for outputting said switch driving signal.

14. The cathode ray tube display apparatus as set forth in claim 13, wherein said switch circuit comprises:

a fourth resistor having one terminal connected to said capacitor for receiving said switch driving signal;

a fifth resistor connected between said ground terminal and said one terminal of said fourth resistor;

a diode having a cathode connected to said one terminal of said fourth resistor and an anode connected to said ground terminal; and a second transistor having a base connected a second terminal of said fourth resistor, an emitter connected to said ground terminal, and a collector to which said synchronization signal output from said state signal generating circuit is applied.

15. The cathode ray tube device as set forth in claim 14, wherein said synchronization signal is a horizontal synchronization signal.

16. The cathode ray tube device as set forth in claim 14, wherein said synchronization signal is a vertical synchronization signal.

17. A method for protecting a cathode ray tube driving circuit which drives a cathode ray tube in accordance with a synchronization signal provided from a host, said method comprising:

detecting when a frequency of said synchronization signal is not within a predetermined range; and connecting said synchronization signal to a ground terminal when it is detected that said frequency of said synchronization signal is not within a predetermined range.

* * * * *